United States Patent
Hojjati (10) Patent No.: US 12,483,415 B2
(45) Date of Patent: Nov. 25, 2025

(54) IDENTIFYING DEEP FAKE CONTENT VIA SMART DEVICES

(71) Applicant: DigiCert, Inc., Lehi, UT (US)

(72) Inventor: Avesta Hojjati, Austin, TX (US)

(73) Assignee: DigiCert, Inc., Lehi, UT (US)

( * ) Notice: Subject to any disclaimer, the term of this patent is extended or adjusted under 35 U.S.C. 154(b) by 224 days.

(21) Appl. No.: 18/186,664

(22) Filed: Mar. 20, 2023

(65) Prior Publication Data

US 2023/0344639 A1 Oct. 26, 2023

Related U.S. Application Data

(63) Continuation-in-part of application No. 17/660,130, filed on Apr. 21, 2022, now Pat. No. 12,088,739.

(51) Int. Cl.
| | |
|---|---|
| H04L 29/00 | (2006.01) |
| G06V 10/26 | (2022.01) |
| G06V 20/58 | (2022.01) |
| H04L 9/32 | (2006.01) |

(52) U.S. Cl.
CPC ............ H04L 9/3236 (2013.01); G06V 10/26 (2022.01); G06V 20/582 (2022.01); H04L 9/3247 (2013.01); H04L 9/3263 (2013.01)

(58) Field of Classification Search
CPC ... H04L 9/3236; H04L 9/3247; H04L 9/3263; H04L 2209/84; H04L 9/3213; G06V 10/26; G06V 20/582
See application file for complete search history.

(56) References Cited

U.S. PATENT DOCUMENTS

| | | | |
|---|---|---|---|
| 11,546,503 B1* | 1/2023 | Kundu | H04N 7/181 |
| 2012/0079287 A1* | 3/2012 | Leclercq | G06F 21/575 |
| | | | 713/192 |
| 2015/0074415 A1* | 3/2015 | Tanner | H04L 9/3263 |
| | | | 713/168 |
| 2016/0019538 A1* | 1/2016 | Arif | G06T 7/90 |
| | | | 705/44 |
| 2016/0065555 A1* | 3/2016 | Branden | H04L 63/0807 |
| | | | 726/7 |
| 2019/0347388 A1* | 11/2019 | Jiang | G06V 10/82 |
| 2021/0248446 A1* | 8/2021 | Hughes | G06N 3/045 |
| 2022/0057519 A1* | 2/2022 | Goldstein | G01S 17/88 |
| 2022/0174076 A1* | 6/2022 | Nomula | G06V 20/41 |
| 2023/0224169 A1* | 7/2023 | Liu | H04L 9/3247 |
| | | | 713/156 |

* cited by examiner

*Primary Examiner* — Ghazal B Shehni
(74) *Attorney, Agent, or Firm* — Baratta Law PLLC; Lawrence A. Baratta, Jr.; Ryan Odessa (57) ABSTRACT

A method of identifying deep fake content includes receiving content at a smart device; determining whether the content includes a hidden object therein; responsive the content including the hidden object, determining a hash in the hidden object; determining a local hash for the content by the smart device; and determining legitimacy of the content based on the hash in the hidden object and the local hash. The hidden object can be a JavaScript Object Notation (JSON) Web Token (JWT).

18 Claims, 9 Drawing Sheets

IDENTIFYING DEEP FAKE CONTENT VIA SMART DEVICES

CROSS-REFERENCE TO RELATED APPLICATION(S)

The present disclosure is a continuation-in-part of U.S. patent application Ser. No. 17/660,130, filed Apr. 21, 2022, the contents of which are incorporate by reference in their entirety.

FIELD OF THE DISCLOSURE

The present disclosure relates generally to networking and computing. More particularly, the present disclosure relates to systems and methods for identifying deep fake videos and images, such as on smart devices, via a camera, and the like.

BACKGROUND OF THE DISCLOSURE

The term deep fake (also sometimes referred to as deepfake) refers is media such as videos and images that are so realistic, a viewer is often unable to tell it is not real. Deep fake is a combination of the terms "deep learning" and "fake." Of course, fake content (i.e., video, images, audio, websites, traffic signs, etc.) is not new, but the deep learning aspect leverages machine learning and artificial intelligence techniques to generate content that is more realistic and often very difficult to detect, i.e., real vs. fake. There is a host of problems if we cannot discriminate between real and fake content. For example, political campaigns will no longer need to run attack ads, but rather simply leak a deep fake video of the opponent saying or doing something unfortunate.

There is a need for verification techniques to discriminate between real content and deep fake content.

BRIEF SUMMARY OF THE DISCLOSURE

The present disclosure relates to systems and methods for identifying deep fake content including videos and images, such as on smart devices, via cameras, and the like. In various embodiments, the present disclosure provides techniques for verification of content, including, e.g., video, images, audio, websites, traffic signs, etc.) with the objective of informing end users of the validity (e.g., with respect to video, images, audio, websites, etc.) as well as autonomous vehicles (e.g., with respect to traffic signs).

In an embodiment, a method of identifying deep fake content includes steps. In another embodiment, a non-transitory computer-readable medium includes instructions that, when executed, cause one or more processors to execute the steps. The steps include receiving content at a smart device; determining whether the content includes a hidden object therein; responsive the content including the hidden object, determining a hash in the hidden object; determining a local hash for the content by the smart device; and determining legitimacy of the content based on the hash in the hidden object and the local hash. The hidden object can be a JavaScript Object Notation (JSON) Web Token (JWT). The JWT can be embedded in the content using Least Significant Bit (LSB) steganography. The smart device can be a smart television and the content is video. The steps can further include determining the legitimacy by verifying a signature of the hidden object with a public key. The steps can further include, prior to the receiving, creating the hidden object using certificates from entities involved with creation of the content. The steps can further include, subsequent to the determining legitimacy, providing a visible indication on the smart device. The content can be a traffic sign and the smart device is a vehicle having one or more cameras.

In a further embodiment, a smart device includes a display communicably coupled to one or more processors; and memory storing instructions that, when executed, cause the one or more processors to receive content to display on the display; determine whether the content includes a hidden object therein; responsive the content including the hidden object, determine a hash in the hidden object; determine a local hash for the content by the smart device; and determine legitimacy of the content based on the hash in the hidden object and the local hash. The hidden object can be a JavaScript Object Notation (JSON) Web Token (JWT). The JWT can be embedded in the content using Least Significant Bit (LSB) steganography. The smart device can be a smart television and the content is video.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for identifying deep fake content including videos and images, such as on smart devices, via cameras, and the like. In various embodiments, the present disclosure provides techniques for verification of content, including, e.g., video, images, audio, websites, traffic signs, etc.) with the objective of informing end users of the validity (e.g., with respect to video, images, audio, websites, etc.) as well as autonomous vehicles (e.g., with respect to traffic signs).

Of note, the various embodiments described herein relate to automated detection of real and fake content using various techniques. The content can include video, images, audio, websites, traffic signs, etc. Also, of note, while various embodiments are described specifically herein, those skilled in the art will appreciate the techniques can be used together, in combination with one another, as well as each technique can be used individually with the specific use case.

Deep Fake Detection System and Process

Figure 1:
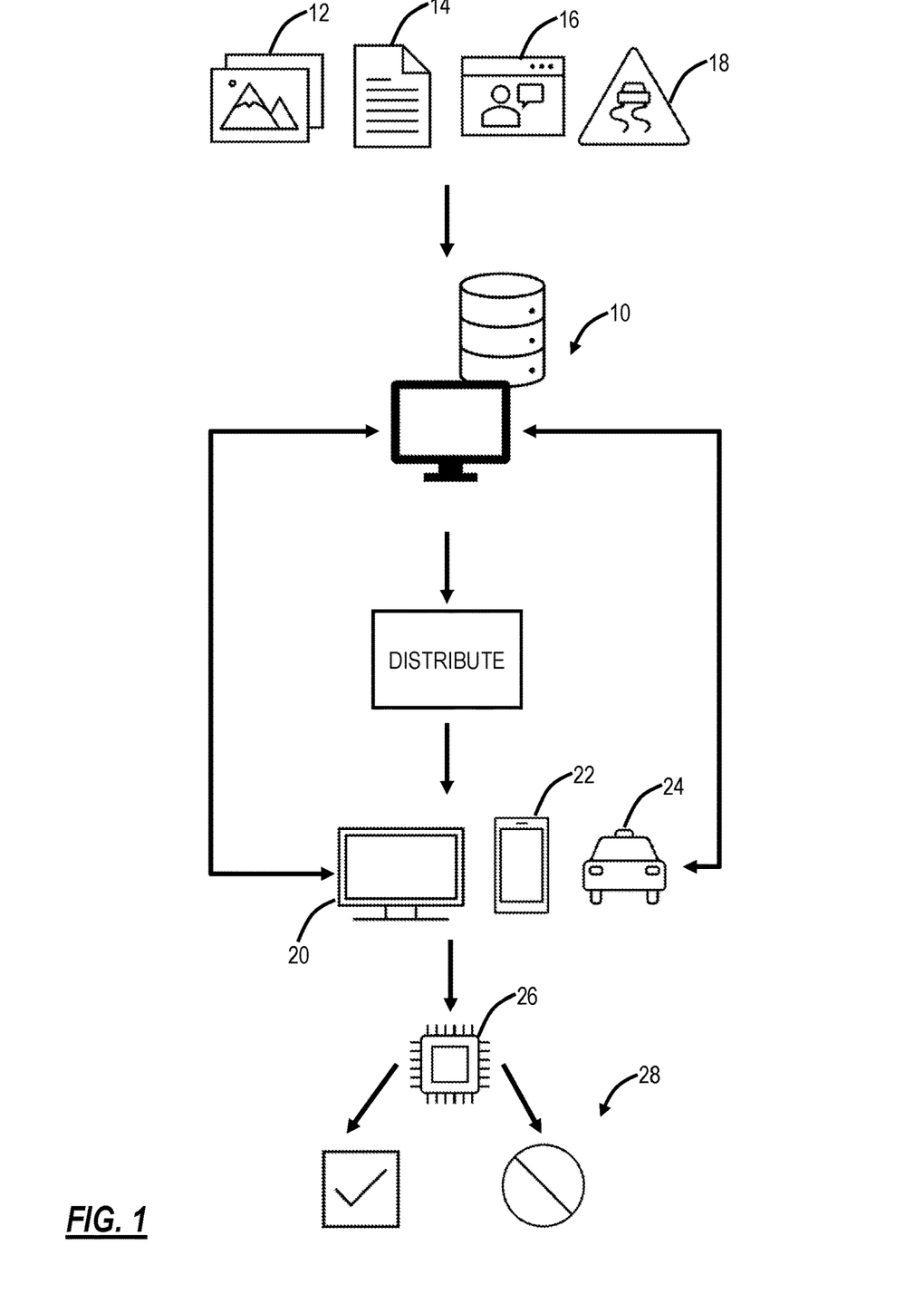
FIG. 1 is a diagram of a deep fake detection system that contemplates use with the various embodiments described herein.
Figure 8:
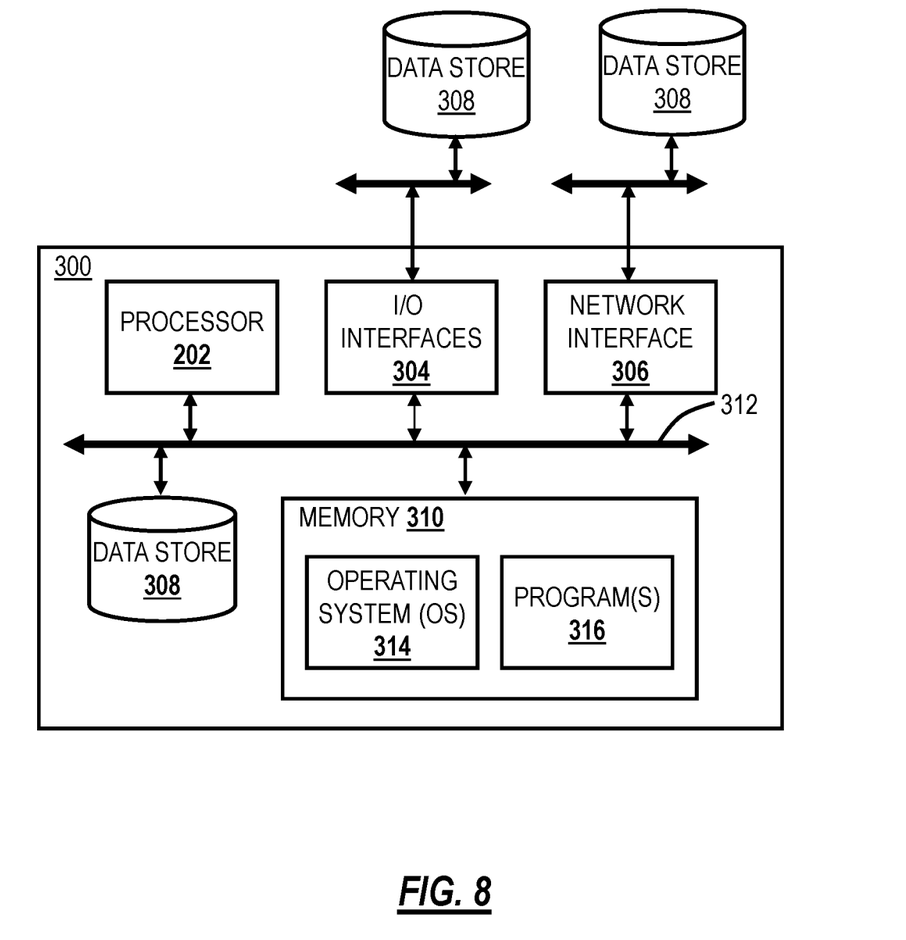
FIG. 8 is a block diagram of a processing system, which may implement any of the devices described herein.

FIG. 1 is a diagram of deep fake detection system 10 that contemplates use with the various embodiments described herein. The deep fake detection system 10 can be a server, a cluster of servers, a cloud service, and the like. FIG. 8 provides an example implementation of a processing device 200 that can be used to physically realize the deep fake detection system 10. FIG. 1 illustrates the detection system 10 and associated process flow for verification of content and subsequent determination whether distributed content is real or fake.

In various embodiments, the content can include pictures 12, text or a file 14, video 16, and a traffic sign 18, collectively content 12, 14, 16, 18. Those skilled in the art will recognize these are some examples of content. Further, the detection system 10 and the subsequent detection of whether the content 12, 14, 16, 18 is real or fake can be dependent on the type of content. For example, the content 12, 14, 16 can be viewed on a smart television 20 or a user device 22, with the smart television 20 or the user device 22 determining whether or not the content 12, 14, 16 is real or not, and performing actions accordingly. In another embodiment, a vehicle 24 can include a camera system configured to detect the traffic sign 18, and to determine whether or not the traffic sign is real or fake based on the various techniques described herein.

A first step in the process flow includes some processing, formatting, and/or embedding data in the content 12, 14, 16, 18, by the deep fake detection system 10. A second step in the process flow includes distribution of the content 12, 14, 16, 18. Those skilled in the art will recognize there can be various types of distribution. For example, the content 12, 14, 16 can be distributed electronically over a network, e.g., the Internet. Also, the content 12, 14, 16 can be broadcast via a streaming service, a television network, etc. The traffic sign 18 is physically distributed, i.e., placed on the side of the road, on an overpass, etc. A third step on the process flow is the end user device, namely the smart television 20, the user device 22, and/or the vehicle 24 performing some analysis 26 of received content 12, 14, 16, 18 and determining 28 whether the content 12, 14, 16, 18 is real or fake (i.e., legitimate or illegitimate). The determining 28 can be made locally at the smart television 20, the user device 22, and/or the vehicle 24, as well as in cooperation with the deep fake detection system 10. Finally, a fourth step in the process flow can include some action at the smart television 20, the user device 22, and/or the vehicle based on the determining 28.

Deep Fake Detection on Smart Devices

Fake news has become a term everyone is familiar with. However, with the proliferation of computing power and machine learning, it is a trivial task to create so-called deep fake content. There has been a proliferation in streaming platforms and video sharing platforms, e.g., YouTube, allowing anyone with a computer to create and post their own content. The main issue with deep fake videos is their incredible ability to convince the audience that the message/connect from the video is from a reliable source. Of course, deep fake videos can be rebutted after they are posted, with crowd sourcing determining a given video is fake. The problem here is the after the fact rebuttal does not convince all users. There is a need to verify the content up front, visibly display the illegitimacy up front, even possibly blocking the content, or allowing the user to proceed after they provide an acknowledgement.

Figure 2:
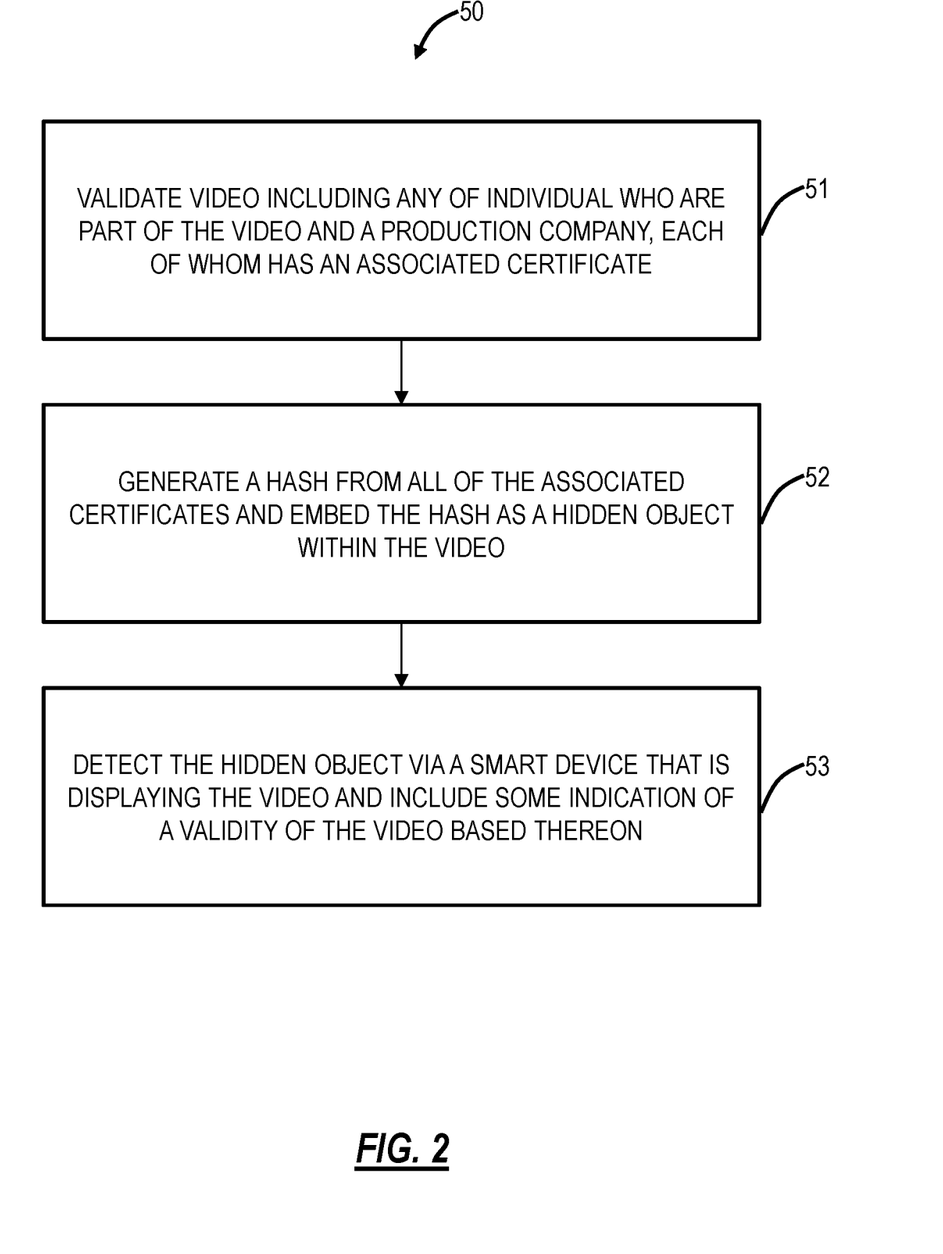
FIG. 2 is a flowchart of a deep fake detection process for identifying fake content on smart devices.

FIG. 2 is a flowchart of a deep fake detection process 50 for identifying fake content on smart devices. The deep fake detection process 50 is described with reference to the various steps in the process flow above. Those skilled in the art will appreciate the steps in the deep fake detection process 50 may occur at different places, systems, processors, etc., and that the claims herein may be written from a single system perspective. That is, the description of the deep fake detection process 50 in FIG. 2 is a process flow, end to end, including steps performed at different locations. Also, the deep fake detection process 50 contemplates implementation with the deep fake detection system 10, the smart television 20, the user device 22, and the like.

The deep fake detection process 50 includes an initial step 51 of validation, where the video 16 is validated based on anyone involved in its production, including individuals who are part of the video 16, a production company associated with the video 16, and the like, each of whom has an associated certificate. Next, the deep fake detection process 50, with the certificates of all involved in the video, includes a stamping step 52 that includes generation of a hash from all of the certificates of all involved in the video and the hash is embedded as a hidden object within the video. The steps 51, 52 are performed in advance of distribution of the video 16.

Next, in a detection step 53, a smart device including the smart television 20, the user device 22, and the like is configured to detect the hidden object while the video 16 is being played, streamed, accessed, etc., and to include some indication of the validity of the video 16 based thereon. That is, the deep fake detection process 50 seeks to utilize watermarking and similar technologies such as object steganography to embedded secret messages within any video postproduction, prior to its release on streaming platforms. The deep fake detection process 50 seeks to (1) validate the individuals or parties who are part of the video and (2) the product company. Once (1) and (2) are determined, we will generate a hash from all of their certificates and place that hash as an hidden object within the video. For example, this can be a JavaScript Object Notation (JSON) Web Token (JWT), such as compliant to RFC 7519, "JSON Web Token (JWT)," May 2015, the contents of which are incorporated by reference in their entirety.

On the user's end, the smart device including the smart television 20, the user device 22, and the like is equipped with screen readers where it will look for that JWT object and if it is presented, the smart device will flag the video as a valid and authentic video, such as via some visual means. Other embodiments are also contemplated, such as blocking invalid videos, presenting the user an option to proceed based on the video being unvalidated, and the like.

Again, the approach in the deep fake detection process 50 is designed so the user is informed in advance of the validity of the video 16, to avoid any audience confusion. Of course, other services provide so-called verification statements related to certain content. However, these are still someone's opinion. For example, rating a social media posting, etc. The deep fake detection process 50 provides a front-end verification that the video 16 comes from a legitimate source. It does not rate the content per se, but rather attests to the fact the video 16 comes from the individuals, the production company, etc. associated with the video 16. That is, the video 16 may still contain false or misleading content, but the end user is assured the video 16 originates from the source and is not a deep fake.

One aspect of the deep fake detection process 50 includes the processing capability on so-called smart televisions 20. Specifically, such devices are more than mere displays for content. Rather, the smart televisions 20 include software, operating systems, and processors, which collectively can be used to detect the hidden object within the video. For example, the smart televisions 20 can be loaded with software and/or firmware for detection and display of validity. The validity can be displayed in any manner, including, e.g., a banner, a seal, a pop up, etc.

Authenticated Traffic Skins

Existing advancements in developing autonomous vehicles has enabled the next generation of such vehicles to be equipped with many sensors such as high definition cameras. Such cameras are being used to collected environmental data such as reading the traffic signs 18 in order to automatically adjust the vehicle's speed, stop at intersections, or slow down if there is a bump on the road. The issue with such approach is that anyone can place a random traffic sign 18 on any road essentially compromising the processing/decision making flow of a smart vehicle 24, resulting in an unexpected outcome such as stopping the vehicle/s in middle of a highway causing catastrophic accidents.

Figure 3:
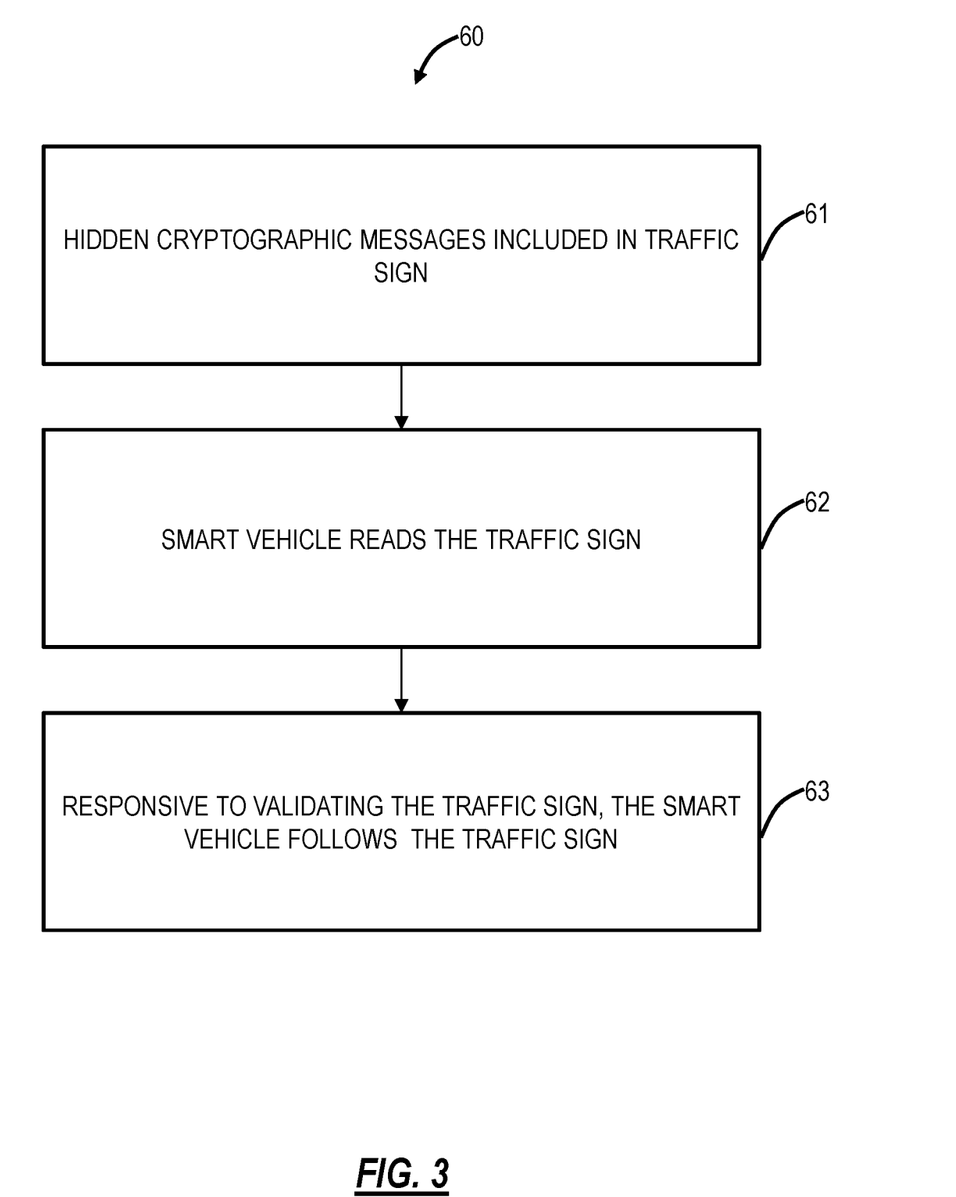
FIG. 3 is a flowchart of a deep fake detection process for identifying fake traffic signs by smart vehicles.

FIG. 3 is a flowchart of a deep fake detection process 60 for identifying fake traffic signs by smart vehicles. Again, those skilled in the art will appreciate the steps in the deep fake detection process 60 may occur at different places, systems, processors, etc., and that the claims herein may be written from a single system perspective. That is, the description of the deep fake detection process 60 in FIG. 3 is a process flow, end to end, including steps performed at different locations. Also, the deep fake detection process 60 contemplates implementation with the deep fake detection system 10, the vehicle 24, and the like. It is important to note while the vast majority of the traffic signs 18 may be valid, it is imperative that any false traffic sign be detected, for safety reasons.

The deep fake detection process 60 includes having hidden cryptographic messages 61 included in traffic signs. That is, the present disclosure contemplates utilizing object stenography or Quick Response (QR) codes in order to validate the authenticity of traffic signs. An autonomous vehicle 62 equipped with a camera is capable of reading these authentic traffic signs and can follow authentic signs 63 while ignores any other traffic sign where it is not cryptographically signed. The certificate used for this process could hold information such as the coordination of the traffic sign, the issuing authority, and other valuable data that assist with making the sign unique.

Fake News Detection

Fake news (content) could be combatted by securely signing images and providing meta about the image in order to prevent people from misrepresenting a valid image. The objective is to treat and view content like web pages, i.e., HTTP vs. HTTPS. That is, an HTTPS site is trustworthy more so than an HTTP site. For example, we know a site with HTTPS is inherently more secure than one with HTTP. The present disclosure proposes various approaches with various content to add this distinction. Another example is code signing which is the process of applying a digital signature to a software binary or file. Advantageously, this digital signature validates the identity of the software author and/or publisher and verifies that the file has not been altered or tampered with since it was signed. Code signing is an indicator to the software recipient that the code can be trusted, and it plays a pivotal role in combating malicious attempts to compromise systems or data. Use cases for code signing can include, for example, software for internal or external use, patches or fixes, testing, Internet of Things (IoT) device product development, computing environments, and mobile apps.

Content Publisher Signing Flow

Similar to code signing, the present disclosure contemplates an initial step of content signing. This can be the first step in the process flow above, namely processing, formatting, and/or embedding data in the content 12, 14, 16, 18, by the deep fake detection system 10, via content publisher signing.

Figure 4:
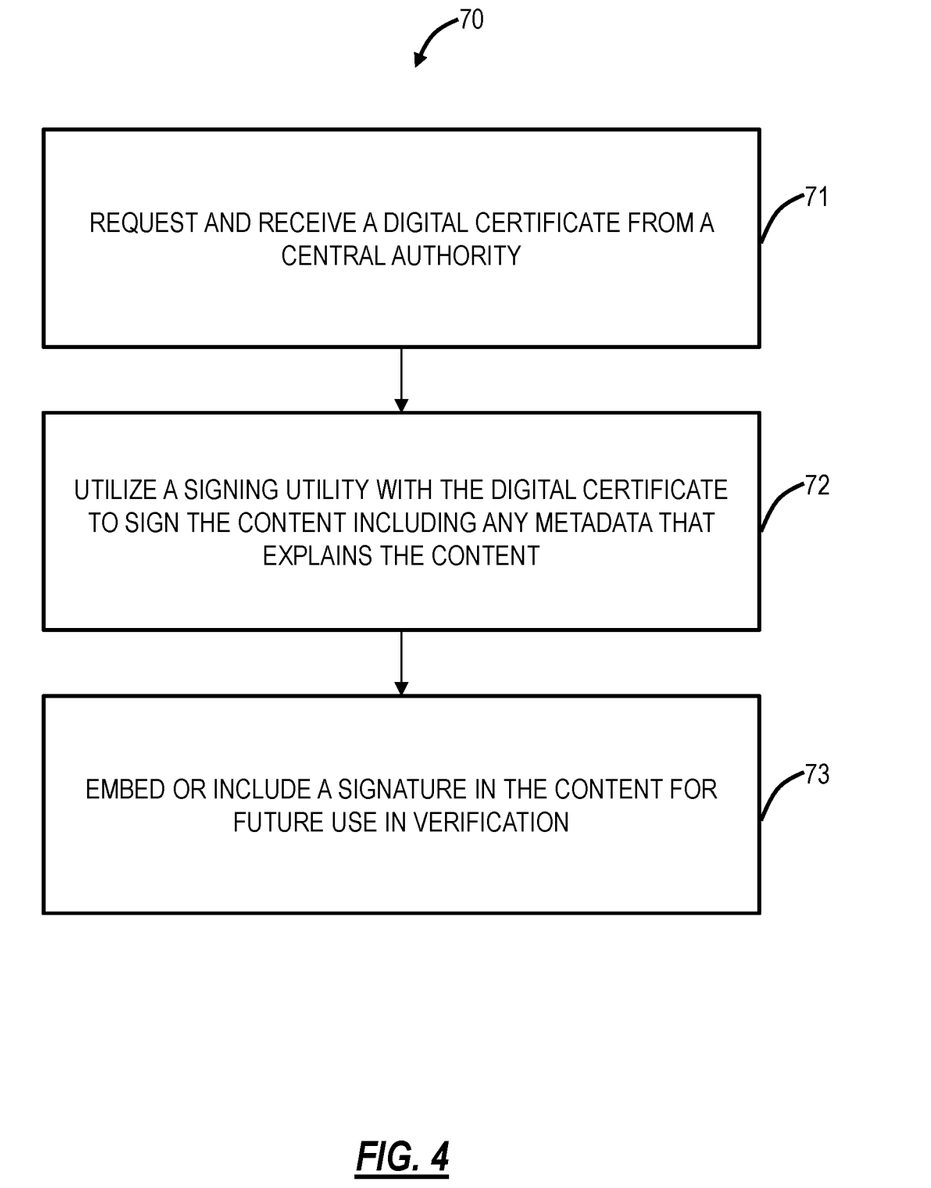
FIG. 4 is a flowchart of a content publisher signing process.

FIG. 4 is a flowchart of a content publisher signing process 70. The content publisher signing process 70 focuses on the first step in the process flow above. The content publisher signing process 70 contemplates implementation as a method having steps, via a processing device configured to implement the steps, via a cloud service configured to implement the steps, and via a non-transitory computer-readable medium storing instructions that, when executed, cause one or more processors to execute the steps. The content publisher signing process 70 also contemplates implementation via a signing utility service or application that behaves much like a code signing utility where a publisher could sign their own content 12, 14, 16, 18 including metadata about that content 12, 14, 16, 18. The content publisher signing process is described herein with reference to steps performed by a content publisher, i.e., any entity responsible for creating the content 12, 14, 16, 18.

The content publisher signing process 70 includes requesting and receiving a digital certificate from a central authority (step 71). This can be a private key and the content publisher can store this digital certificate securely, such as in a Hardware Security Module (HSM), etc. Here, the central authority would verify the content publisher and use an intermediate content signing certificate to issue a new certificate to the content publisher. The content publisher utilizes a signing utility with the digital certificate to sign the content 12, 14, 16, 18, including any metadata that explain the content 12, 14, 16, 18 or the context thereof (step 72). For example, the metadata can include a title, caption, date, location, author, and the like. Next, the signature from the signing utility is embedded or included in the content 12, 14, 16, 18 for future use in verification (step 73).

Signing Utility

Figure 5:
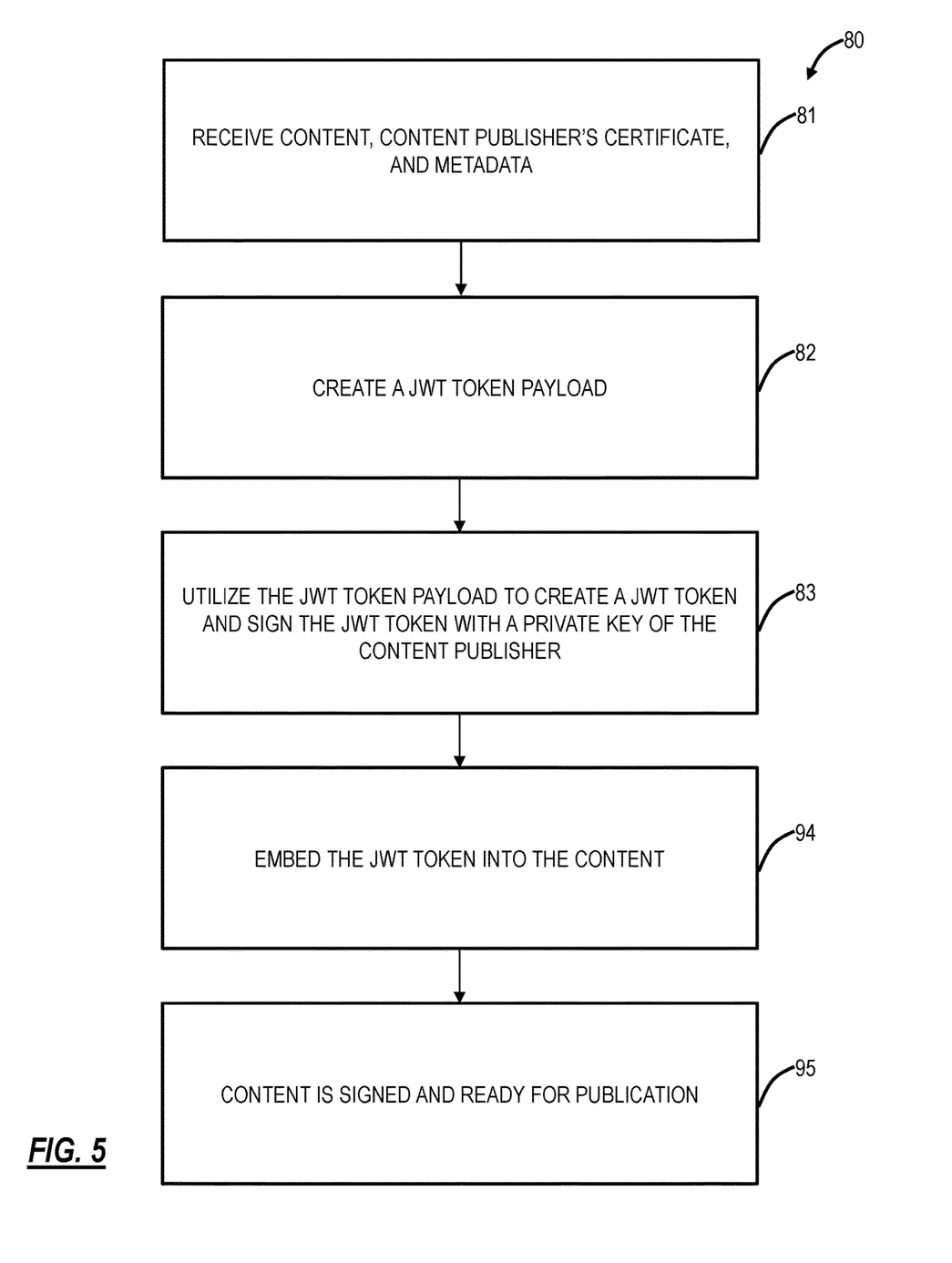
FIG. 5 is a flowchart of a signing utility process.

In an embodiment, the signing utility utilizes JWT tokens to securely store the relevant information and uses Least Significant Bit (LSB) steganography to embed the JWT token in the content 12, 14, 16, 18. Other approaches are also contemplated. FIG. 5 is a flowchart of a signing utility process 80. The signing utility process 80 contemplates implementation as a method having steps, via a processing device configured to implement the steps, via a cloud service configured to implement the steps, and via a non-transitory computer-readable medium storing instructions that, when executed, cause one or more processors to execute the steps.

The signing utility process 80 includes receiving the content 12, 14, 16, 18, the content publisher's certificate, and metadata (step 81). The signing utility process 80 creates a JWT token payload (step 82). The JWT token payload can contain the metadata, the certificate, a hash such as with the most significant bits of the content, etc. The hash can be calculated as follows, assuming the content 12, 14, 16, 18 is an image. The image can be first turned into an array of 8-bit unsigned integers representing subpixels with the values 0-255, each sub pixel value is shifted once to the right, the entire array is hashed with SHA-256, and the resulting hash is then stored in the payload.

Next, the signing utility process 80 utilizes the JWT token payload to create a JWT token and signs the JWT token with the private key of the content publisher (step 83). The signing utility process 80 include embedding the signed JWT token into the content (step 84), such as using LSB steganography. In an embodiment of the LSB, the first 32 bytes, (32 subpixels), are used to encode the length of the message—a message with x characters will be converted to 8-bit numbers with a total of 8*x bits with a message length of 8*x being encoded into the least significant bits of the first 32 bytes of the image. This means that the original value of the first 32 subpixels (11 full pixels) can be modified by ±1 because the least significant bits now contain the information about the length instead of their original values. After the first 32 bytes of the image (subpixels), the next 8*x (x being the number of characters in the message) bytes of the image are used to store the message in their respective least significant bits. The first 32+8*x subpixels have now been modified and no longer hold the information about color but instead hold the information of the embedded message. This changes the image in a very unnoticeable way because each subpixel has only changed by 1 or even possibly stayed the same. Of course, other approaches are also contemplated. The content is now signed and ready to be published and then verified by end users (step 85).

Verification

Figure 6:
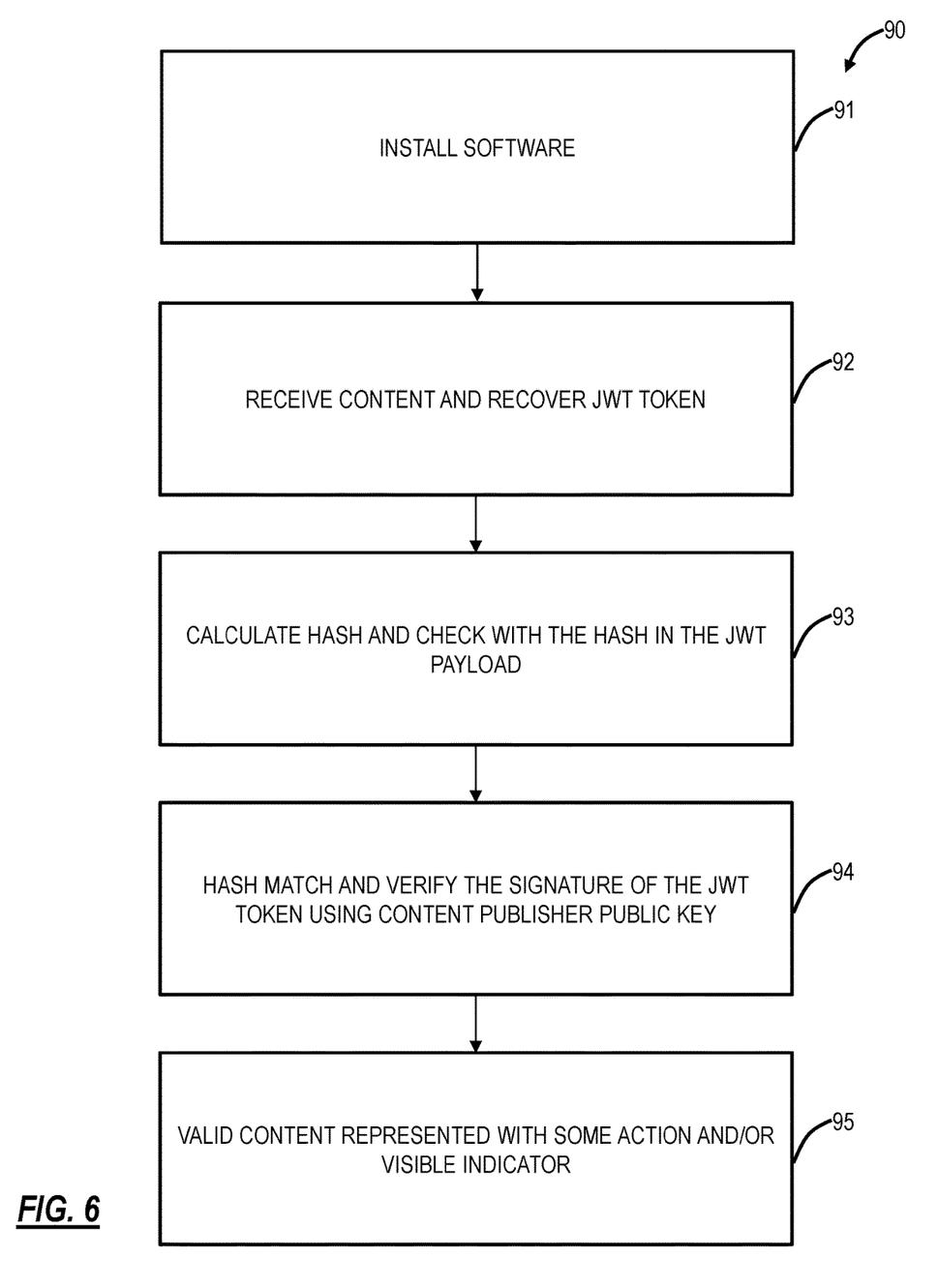
FIG. 6 is a flowchart of a verification process implemented by the smart television, the user device, and/or the vehicle.

Once the content 12, 14, 16, 18 is signed, the smart television 20, the user device 22, and/or the vehicle 24 needs to verify the content 12, 14, 16, 18. FIG. 6 is a flowchart of a verification process 90 implemented by the smart television 20, the user device 22, and/or the vehicle 24. The verification process 90 contemplates implementation as a method having steps, via a processing device configured to implement the steps, via a cloud service configured to implement the steps, and via a non-transitory computer-readable medium storing instructions that, when executed, cause one or more processors to execute the steps. For illustration purposes, the verification process 90 is described with reference to the user device 22, and specifically to a browser (e.g., Chrome) extension. Those skilled in the art will recognize other software implementations are contemplated with the verification process 90 presented for illustration purposes.

The verification process 90 includes installing software (step 91). This can include a browser extension on the user device 22, over-the-air download in a vehicle 24, and the like. Of course, the devices 20, 22, 24 can be preloaded with the software. Again, in an embodiment, the software is a browser extension. Once installed, the software is configured to verify the content 12, 14, 16, 18, e.g., a Chrome extension could be used to verify images and display the metadata such as via a pop over icon or other ways in the future.

The verification process 90 includes receiving the content 12, 14, 16, 18 and recovering the JWT token (step 92). For example, the software can use LSB to get the JWT token. In an embodiment, as described above, the first 32 bytes, (32 subpixels), are used to encode the length of the message—the least significant bit (the right most bit) is inspected and copied to create a 32 bit number which has a max of 4294967296. Using the length, x, taking the least significant bit from the next x bytes in the image, the message is now a x length array of bits. The x length array of bits is then converted to an array 8-bit numbers (0-255). The x/8 length array of numbers from 0-255 are then converted to UTF-8 characters, and the message (JWT Token) has now been recovered. Inside the JWT token, the payload is now visible and the payload data contains the certificates, metadata, and the Most Significant Bit (MSB) hash of the content. The MSB hash is the key to tightly coupling the JWT token to the correct content.

The software then calculates its own MSB hash and checks to make sure it matches with the MSB hash in the JWT payload (step 93). if the hashes do not match, then the content has been modified and is not "Secure." Assuming the hashes matched, the certificates are then validated using chain validation, and once the final publisher certificate is validated then the public key is used to verify the signature of the JWT token itself (step 94). Valid content can be represented by some action and/or visible indicator. For example, visible content on the smart television 20 or user device 22 can include some flag or other visible means to convey the legitimacy. The action can be blocking the content or allowing the content once a user clicks on an acknowledgement. For the vehicle 24, the action can be at least ignoring the traffic sign 18.

Intelligent Non-Copyable Smart Seal

Seals, or Trust Seals, on-line to date contain only static or linked information. In an embodiment, the present disclosure expands this to have conditional and dynamic capabilities to the traditional site seal where each seal is unique for a short period of time such as via its QR capability, thus making it impossible to copy the seal and presenting it at a different website. The conditional aspect could display identity or security information where it has been previously validated via validation agents. The site seal could dynamically alter and change upon changes of data. In one embodiment, this new process will display a trust seal combined with a dynamic QR code on achieving a defined set of attributes related to site security or identity. This site seal contemplates implementation with any of the content 12, 14, 16, 18.

Recognizing "trust" and "identity" online is confusing and website or visual interface viewers often find it confusing to know what is safe, what is not. For example, typical browsers today only show the negative, when they (the browser companies) decide that something is 'bad' and they reject connecting. A more positive experience is when we have more information, in a way that is easy to consume, simple to recognize, and not repeatable for invalid websites. In other words, the current trust seal indicators are easily repeatable via screen capture or a simple search on the internet which essentially allows malicious websites to also have a trust indication.

The visibility of the logo of the site your visiting, appearing in a 3rd party verification (in this case the seal), provides positive validation that a set of security and identity challenges have been met, thereby improving comprehension of the safety and security efforts invested by the site provider. The display of additional identity and security information to the content 12, 14, 16, 18 you are viewing including all the checks performed or analysis of the domain, organization, and company to help the Internet user determine if the site is trustworthy and safe to use.

In an embodiment, the QR functionality (Quick Response) allows the user to either us a browser plugin or the camera on their smart phone to validate the seal authenticity at any point, essentially increasing the overall trust that users can have while interacting with content 12, 14, 16, 18.

Figure 7:
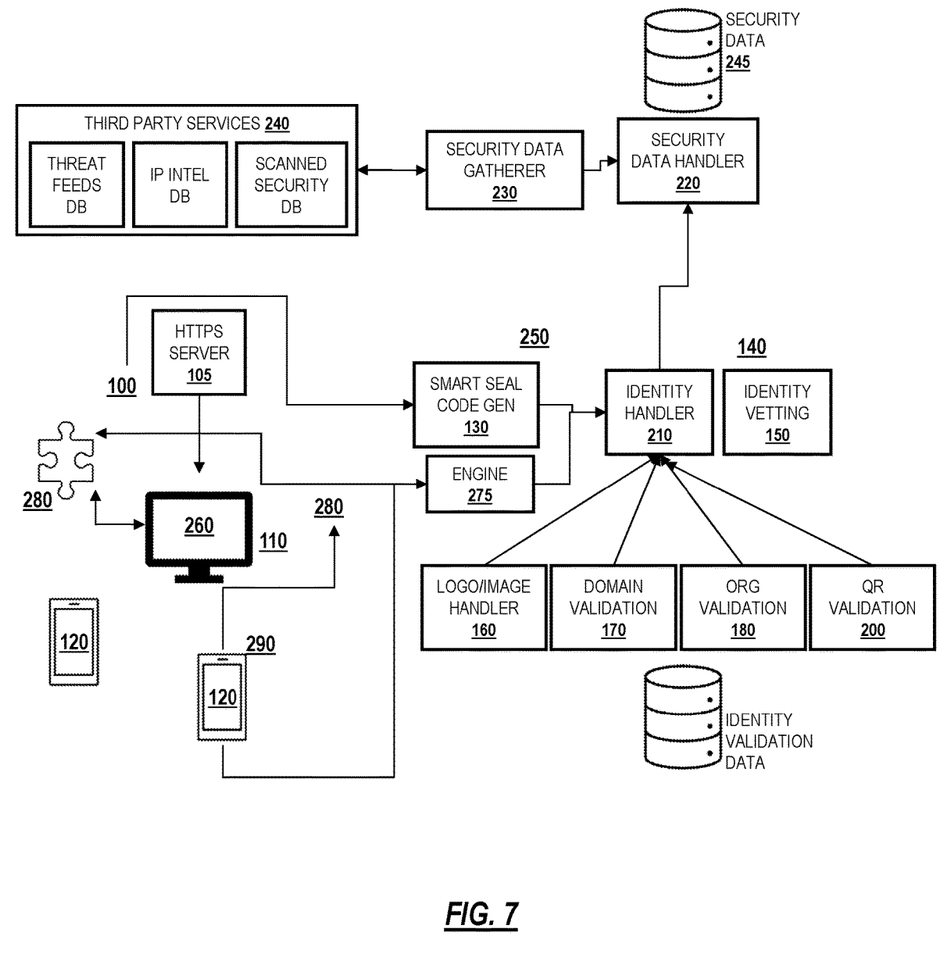
FIG. 7 is a network diagram of example systems and process flow for a conditional smart seal.

FIG. 7 is a network diagram of example systems and process flow for a conditional smart seal for the content 12, 14, 16, 18. Of course, those skilled in the art will appreciate other implementations are also contemplated. As described herein, a site seal can be something embedded in or included with the content 12, 14, 16, 18 for purposes of conveying its legitimacy. The following description is for a site seal for a website, but those skilled in the art will recognize this can be applied to any of the content 12, 14, 16, 18.

A site seal is traditionally used to list that a website uses a particular certificate authority or could be used to state that they have had some identity or other capabilities that have passed checks and vetting with a company. In an embodiment, the approach described herein seeks to solve the issue with the traditional site seals where copying the seal via methods such as screenshot was easy and essentially it was reducing the authenticity of the seal via placing it on an unverified website.

In an embodiment and with reference to FIG. 7, starting at 100 you see a website administration (content publisher) who would like to display a smart seal on their website. The website admin has a web server 105 which the smart seal code will be deployed. The smart seal will be displayed on a web browser website 110. There can be the seal at the bottom right corner of the website. This is more than an image and could be located within any point of the webpage. An Internet user 120 who is browsing to the web server URL address and when the HTML page is generated, it will also load up the site seal code to display which the website admin 100 placed on the web server 105. The Internet user 120 will interact with the smart seal via either a browser plugin 280 which previously has been installed or via a camera 290 on their smart phone capable of scanning a QR code.

To get the smart seal code, the website admin 100 will need to come to a certificate authority and request the smart seal code. The website admin requests the smart seal code generator 130. A validation agent 140 performs the identity vetting for the website identity 150. The identity vetting could be performed at the time the website admin 100 requests the smart seal 130 or it could be pre-vetted. This does not have to be dynamic at the time but could be performed hours, days, months ahead of time. The identity vetting 130 could also be identity vetting done typical of a public trusted certificate authority or could be just in time as the website admin requests it.

Identity vetting could include the following types of information—(1) Logo/Image/Trademark, (2) Domain, (3) Organization, and (4) Other possible identity data. A logo/image could be a trademarked image or could be a vetted information from other sources. The validation agent at 140 could perform vetting from the associated countries trademark database or could be vetted logo information from something like the industry standard BIMI (Brand Indicators for Message Identification) or from numerous other ways to vet a logo to be used to display within a smart seal. In practice you would want some type of vetting to be performed on the logo/image to be inserted within the smart seal but in reality, it does not necessarily have to be vetted.

A Logo/Image handler 160 can gather the vetted logo or image that is stored within an identity validation database. Domain Validation 170 is the domain URL data and the vetted data that is performed in a typical publicly trusted Transport Layer Security (TLS) certificate. Organization Validation data 180 for the organization identity information is vetted data associated with the domain. This is also known to the art and is typical for a publicly trusted TLS certificate. There could be additional Identity data that could be used this could be information such as individual identity, country specific identity information, or other possible identity data. A QR validation function 200 is capable of validating the authenticity of QR codes issued to each unique website. Each of these identity information is used within the smart seal 110 which is displayed to the Internet User 120.

An Identity Handler 210 gathers all the associated identity information that could be used/displayed within the smart seal. The Identity Handler 210 could also request additional security information from a Security Data Handler 245. The Security Data Handler 245 could use various identity information gathered by the Identity Handler 210. For example, a domain could be used to gather security information regarding that domain. An organization name could be used to gather security data regarding that organization. Other identity information could be used to gather security data.

Additionally, at 230 there is a Security Data Gatherer, this gathers security data from other $3^{rd}$ party data sources or it could be data sources within the company. Examples of data sources are at 240 which could include threat feed databases, IP intelligence databases, scanned security databases, or any number of other possible security data sources. The Security Data Gatherer 230 also has a timer to perform regular re-gathers of the data sources. All of the data is stored within a security data database 245 and stored in a fashion where historical information can be display either via the smart seal at 110 or could be utilized for conditional display changes or risk changes of the domain in question.

Now all the identity and security data has been gathered the smart seal generator 130 can create the smart seal code at 250. The smart seal code can also include a timer which would cause a dynamic code refresh which would modify the smart seal as it's vended to the browser. The website admin 100 can now place the customized smart seal code on the web server 105. You can see the smart seal code at 260.

Now that the smart seal code is on the website. The Internet User 120 will open the domain URL which causes the webserver to vend the HTML content including the smart seal code to the browser 260. You can see an example of a smart seal at 110. The smart seal code is intelligent code that updates either naturally with a timer or it could update based off of gathering new data and information directly from the smart seal engine at 275. The QR on 110 is also derived based on a timer where every so frequently a new QR code will be generated. This guarantees that no attacker can copy the seal and place it on their websites since either browser plugin 280 or smartphone camera 290 will validate the QR code. When the smart seal code is executed on the browser, gathering date from the smart seal engine 275, the seal itself will modify based off the content. The smart seal starts at 280 with a logo depicting some indication of security, then upon a hover/set time/or other possible variables it will change to display information at 290. This information could include identity information or security information or both. All of this could cycle numerous times with numerous various images or data depicting identity or security information. The Internet User 120 now has a method to trust the domain that he/she has gone to. The Internet User can see various identity or security information including a logo that they might regular see noting that this is a trustworthy site with additional points of validation to increase its trust worthiness.

Processing System

FIG. 8 is a block diagram of a processing system 300, which may implement any of the devices described herein. The processing system 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 8 depicts the processing system 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example, but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a Central Processing Unit (CPU), an auxiliary processor among several processors associated with the processing system 300, a semiconductor-based microprocessor (in the form of a microchip or chipset), or generally any device for executing software instructions. When the processing system 300 is in operation, the processor 302 is configured to execute software stored within the memory 310, to communicate data to and from the memory 310, and to generally control operations of the processing system 300 pursuant to the software instructions. The I/O interfaces 304 may be used to receive user input from and/or for providing system output to one or more devices or components.

The network interface 306 may be used to enable the processing system 300 to communicate on a network, such as the Internet. The network interface 306 may include, for example, an Ethernet card or adapter or a Wireless Local Area Network (WLAN) card or adapter. The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 308 may incorporate electronic, magnetic, optical, and/or other types of storage media. In one example, the data store 208 may be located internal to the processing system 300, such as, for example, an internal hard drive connected to the local interface 312 in the processing system 300. Additionally, in another embodiment, the data store 308 may be located external to the processing system 300 such as, for example, an external hard drive connected to the I/O interfaces 204 (e.g., SCSI or USB connection). In a further embodiment, the data store 208 may be connected to the processing system 300 through a network, such as, for example, a network-attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 may include one or more software programs, each of which includes an ordered listing of executable instructions for implementing logical functions. The software in the memory 310 includes a suitable Operating System (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

Of note, the general architecture of the processing system 300 can define any device described herein. However, the processing system 300 is merely presented as an example architecture for illustration purposes. Other physical embodiments are contemplated, including virtual machines (VM), software containers, appliances, network devices, and the like.

In an embodiment, the various techniques described herein can be implemented via a cloud service. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. The phrase "Software as a Service" (SaaS) is sometimes used to describe application programs offered through cloud computing. A common shorthand for a provided cloud computing service (or even an aggregation of all existing cloud services) is "the cloud."

Process of Identifying Deep Fake Content

Figure 9:
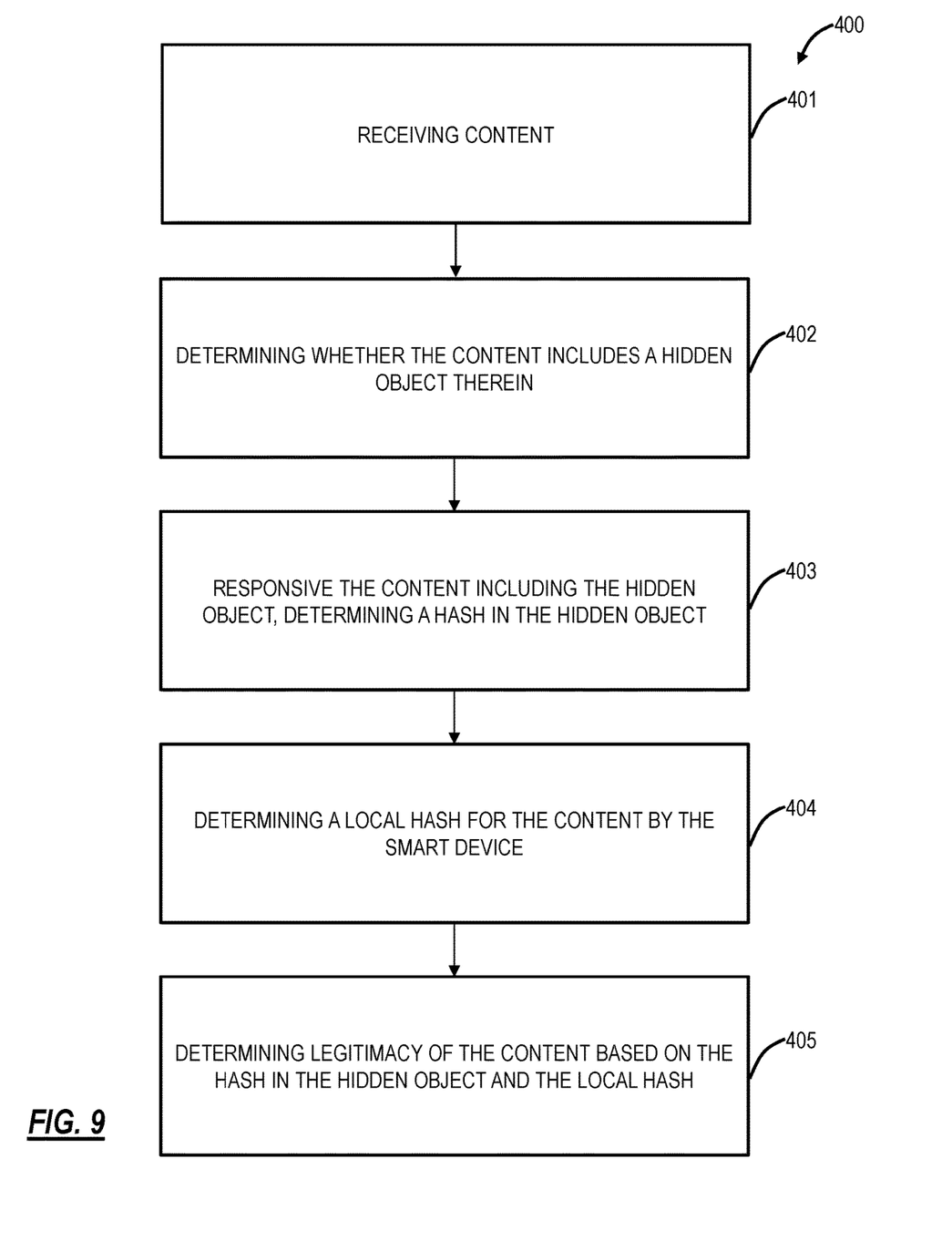
FIG. 9 is a flowchart of a process of identifying deep fake content.

FIG. 9 is a flowchart of a process 400 of identifying deep fake content. The process 400 contemplates implementation as a method having steps, via a processing device in a smart device configured to implement the steps, and via a non-transitory computer-readable medium storing instructions that, when executed, cause one or more processors to execute the steps.

The process 400 includes receiving content at a smart device (step 401); determining whether the content includes a hidden object therein (step 402); responsive the content including the hidden object, determining a hash in the hidden object (step 403); determining a local hash for the content by the smart device (step 404); and determining legitimacy of the content based on the hash in the hidden object and the local hash (step 405).

The hidden object can be a JavaScript Object Notation (JSON) Web Token (JWT). The JWT can be embedded in the content using Least Significant Bit (LSB) steganography. The smart device can be a smart television and the content is video. The process 400 can further include determining the legitimacy by verifying a signature of the hidden object with a public key. The process 400 can further include, prior to the receiving, creating the hidden object using certificates from entities involved with creation of the content. The process 400 can further include, subsequent to the determining legitimacy, providing a visible indication on the smart device. Note, in some embodiments, the content may not include the hidden object, in which case the visible indication can be omitted.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method of identifying deep fake content, the method comprising steps of:
    creating a hidden object using certificates from entities involved with creation of content, wherein the hidden object is a has generated from certificates associated with the entities involved with creation of the content;
    receiving content at a smart device;
    determining whether the content includes the hidden object therein;
    responsive to the content including the hidden object, determining a hash in the hidden object;
    determining a local hash for the content by the smart device; and
    determining legitimacy of the content based on the hash in the hidden object and the local hash, wherein determining legitimacy includes identifying deepfake content within the content based on the hash in the hidden object and the local hash.

2. The method of claim 1, wherein the hidden object is a JavaScript Object Notation (JSON) Web Token (JWT).

3. The method of claim 2, wherein the JWT is embedded in the content using Least Significant Bit (LSB) steganography.

4. The method of claim 1, wherein the smart device is a smart television and the content is video.

5. The method of claim 1, wherein the steps further include:
    determining the legitimacy by verifying a signature of the hidden object with a public key.

6. The method of claim 1, wherein the steps further include:
    subsequent to the determining legitimacy, providing a visible indication on the smart device.

7. The method of claim 1, wherein the content is a traffic sign, the smart device is a vehicle having one or more cameras, and the determining legitimacy includes determining whether the traffic sign is one of real or fake.

8. A non-transitory computer-readable medium comprising instructions that, when executed, cause one or more processors to perform steps of:
    creating a hidden object using certificates from entities involved with creation of content, wherein the hidden object is a has generated from certificates associated with the entities involved with creation of the content;
    receiving content at a smart device;
    determining whether the content includes the hidden object therein;
    responsive to the content including the hidden object, determining a hash in the hidden object;
    determining a local hash for the content by the smart device; and
    determining legitimacy of the content based on the hash in the hidden object and the local hash, wherein determining legitimacy includes identifying deepfake content within the content based on the hash in the hidden object and the local hash.

9. The non-transitory computer-readable medium of claim 8, wherein the hidden object is a JavaScript Object Notation (JSON) Web Token (JWT).

10. The non-transitory computer-readable medium of claim 9, wherein the JWT is embedded in the content using Least Significant Bit (LSB) steganography.

11. The non-transitory computer-readable medium of claim 8, wherein the smart device is a smart television and the content is video.

12. The non-transitory computer-readable medium of claim 8, wherein the steps further include:
    determining the legitimacy by verifying a signature of the hidden object with a public key.

13. The non-transitory computer-readable medium of claim 8, wherein the steps further include:
    subsequent to the determining legitimacy, providing a visible indication on the smart device.

14. The non-transitory computer-readable medium of claim 8, wherein the content is a traffic sign, the smart device is a vehicle having one or more cameras, and the determining legitimacy includes determining whether the traffic sign is one of real or fake.

15. A smart device comprising:
a display communicably coupled to one or more processors; and
memory storing instructions that, when executed, cause the one or more processors to:
receive content to display on the display responsive to a hidden object being created using certificates from entities involved with creation of content, wherein the hidden object is a has generated from certificates associated with the entities involved with creation of the content;
determine whether the content includes the hidden object therein;
responsive to the content including the hidden object, determine a hash in the hidden object;
determine a local hash for the content by the smart device; and
determine legitimacy of the content based on the hash in the hidden object and the local hash, wherein determining legitimacy includes identifying deepfake content within the content based on the hash in the hidden object and the local hash.

16. The smart device of claim 15, wherein the hidden object is a JavaScript Object Notation (JSON) Web Token (JWT).

17. The smart device of claim 16, wherein the JWT is embedded in the content using Least Significant Bit (LSB) steganography.

18. The smart device of claim 15, wherein the smart device is a smart television and the content is video.

* * * * *